United States Patent [19]

Sakagami et al.

[11] Patent Number: 5,306,759
[45] Date of Patent: Apr. 26, 1994

[54] COATING COMPOSITION AND PROCESS FOR MANUFACTURING THE SAME

[75] Inventors: Toshinori Sakagami, Suzuka; Koichi Nagano, Tokyo; Tomonobu Shimizu; Kinji Yamada, both of Yokkaichi, all of Japan

[73] Assignee: Japan Synthetic Rubber Co., Ltd., Tokyo, Japan

[21] Appl. No.: 16,300

[22] Filed: Feb. 11, 1993

[30] Foreign Application Priority Data

Feb. 13, 1992 [JP] Japan .................... 4-058824

[51] Int. Cl.$^5$ .................... C08K 5/05
[52] U.S. Cl. .................... 524/379; 524/543; 524/551; 524/555; 524/556; 524/563; 525/100; 525/102; 525/104; 525/106
[58] Field of Search .......... 525/100, 102, 104, 106; 524/379, 551, 543, 563, 555, 556

[56] References Cited

U.S. PATENT DOCUMENTS

| 4,904,721 | 2/1990 | Hanaoka et al. | |
| 5,223,495 | 6/1993 | Inoue et al. | 525/100 |

FOREIGN PATENT DOCUMENTS

| 0274428 | 7/1988 | European Pat. Off. |
| 0275115 | 7/1988 | European Pat. Off. |
| 0358153 | 3/1990 | European Pat. Off. |
| 60-135465 | 7/1985 | Japan |
| 64001769 | 1/1989 | Japan |
| 1051468 | 2/1989 | Japan |

OTHER PUBLICATIONS

Patent Abstracts of Japan, vol. 004, No. 178, Dec. 10, 1980, JP-A-55 116 765, Sep. 8, 1980.
Database WPIL, Derwent Publications Ltd., AN 92-086201, May 13, 1992, JP-A-4 031 475, Feb. 3, 1992.
Database WPIL, Derwent Publications Ltd., AN 91-365129, Feb. 19, 1992, JP-A-3 244 666, Oct. 31, 1991.
Database WPIL, Derwent Publications Ltd., AN 92-109227, Jun. 3, 1992, JP-A-4 050 262, Feb. 19, 1992.

*Primary Examiner*—Melvyl I. Marquis
*Attorney, Agent, or Firm*—Oblon, Spivak, McClelland, Maier & Neustadt

[57] ABSTRACT

A coating composition prepared by adding 0 to 150 parts by weight, in terms of diorganosilane, of a hydrolyzate and/or a partial condensate of an diorganosilane (b), 2 to 300 parts by weight of a vinyl resin containing a silyl group (c), 0.01 to 50 parts by weight of a metal chelate compound (d), and an organic solvent (e), to 100 parts by weight in terms of organosilane of a hydrolyzate and/or a partial condensate of an organosilane (a), to which are added two or more mols of a type of $\beta$-diketone and/or $\beta$-ketoester (f) for one mol of the metal chelate compound (d).

18 Claims, No Drawings

COATING COMPOSITION AND PROCESS FOR MANUFACTURING THE SAME

BACKGROUND OF THE INVENTION

1. Field of the Invention

The present invention relates to a coating composition, and, in particular, to a coating composition with superior storage stability which is suitable for forming a coating film with superior performance on the surface of substrates made of stainless steel, aluminum, ceramics, cement, paper, glass, plastic, inorganic ceramic, and on cloth, or the like.

2. Description of the Prior Art

In recent years there have been increased requirements for a coating composition which can form a coating film with a high degree of hardness and good adherence, superior in resistance to heat, moisture, staining, organic chemicals, acids, alkalis, corrosion, abrasion, weathering, humidity, and the like.

A portion of the above-mentioned requirements has been satisfied by the provision of a coating composition as disclosed in Japanese Patent Laid-open (ko-kai) No. 135465/1985, comprising a dispersion of a partial condensate of an organosilane with a colloidal silica and a silicon-denatured acryl resin; a coating composition as disclosed in Japanese Patent Laid-open (ko-kai) No.1769/1989 comprising a composition formed from a condensation product of an organosilane with a chelated zirconium alkoxide compound and a vinyl resin containing a hydrolyzable silyl group; or a coating composition as disclosed in U.S. Pat. No. 4,904,721 comprising a composition formed from a condensate of organosilane, colloidal alumina and a vinyl resin containing hydrolyzable silyl group.

However, in coating films formed using the coating compositions disclosed in Japanese Patent Laid-open (ko-kai) No. 135465/1985 and U.S. Pat. No. 4,904,721, the glossiness of the coating film decreases on long-term exposure to ultraviolet radiation.

The composition disclosed in Japanese Patent Laid-open (ko-kai) No. 1769/1989 exhibits inadequate stability in storage and, if its solid content is increased, tends to form a gel over in a short period of time.

SUMMARY OF THE INVENTION

Accordingly, an object of the present invention is to provide, with due consideration to the drawbacks of such conventional compositions, a coating composition with superior stability during storage, excellent transparency, and superb adhesion, and which can form a coating film with superior resistance to heat, moisture, sea water, organic chemicals, acids, alkalis, corrosion, abrasion, weathering, humidity, and the like, and which has a high degree of hardness and excellent adherence.

This object is achieved in the present invention by the provision of a coating composition comprising, (I) a composition which comprises the following components (a), (b), (c), (d), and (e):

(a) for 100 parts by weight, in terms of organosilane, of a hydrolyzate and/or a partial condensate of an organosilane represented by formula $R^1Si(OR^2)_3$, wherein $R^1$ is an organic group with 1 to 8 carbon atoms, and $R^2$ is an alkyl group with 1 to 5 carbon atoms or an acyl group with 1 to 4 carbon atoms, said organosilane hereinafter being from time to time referred to as organosilane (a') or component (a'), (b) 0 to 150 parts by weight, in terms of diorganosilane, of a hydrolyzate and/or a partial condensate of a diorganosilane represented by formula $R^1{}_2Si(OR^2)_2$, wherein $R^1$ and $R^2$ are the same as defined above, said diorganosilane hereinafter being from time to time referred to as diorganosilane (b') or component (b'), (c) 2 to 300 parts by weight of a vinyl resin containing a silyl group with at least one silyl group containing a silicon atom linked to a hydrolyzable group and/or a hydroxyl group at the end or a side chain in one polymer molecule, (d) 0.01 to 50 parts by weight of at least one metal chelate compound selected from a group of compounds represented by formulas $Zr(OR^3)_p(R^4COCHCOR^5)_{4-p}$, $Ti(OR^3)_q(R^4COCHCOR^5)_{4-q}$, and $Al(OR^3)_r(R^4COCHCOR^5)_{3-r}$, wherein $R^3$ and $R^4$ are the same or different alkyl groups with 1 to 6 carbon atoms, $R^5$ is an alkyl group with 1 to 5 carbon atoms or an alkoxy group with 1 to 16 carbon atoms, p and q are integers from 0 to 3, and r is an integer from 0 to 2, and (e) an organic solvent; and (f) at least 2 mols, for one mol of said metal chelate compound (d) in said composition (I), of a $\beta$-diketone compound and/or $\beta$-ketoester compound represented by formula $R^4COCH_2COR^5$, wherein $R^4$ and $R^5$ are the same as above, said $\beta$-diketone compound and/or $\beta$-ketoester compound being hereinafter referred to as component (f).

Other objects, features and advantages of the invention will hereinafter become more readily apparent from the following description.

DETAILED DESCRIPTION OF THE INVENTION AND PREFERRED EMBODIMENTS

Each component constituting the composition of the present invention will be explained in detail.

Component (a)

The component (a) is a hydrolyzate and/or a partial condensate obtained by hydrolyzing and condensing an organosilane (a') represented by formula $R^1Si(OR^2)_3$ and is employed as a binder in the composition of the present invention. In a preferred embodiment of the present invention, component (a) is a partial condensate of organosilane (a') and has a weight average molecular weight, in terms of polystyrene, of 500 to 50,000.

$R^1$ in the organosilane (a') is an organic group with 1 to 8 carbon atoms such as, for example, alkyl group such as methyl group, ethyl group, n-propyl group, i-propyl group, or can also be gamma-chloropropyl group, vinyl group, 3,3,3-trifluoropropyl group, gamma-glycidoxypropyl group, gamma-methacryloxypropyl group, gamma-mercaptopropyl group, phenyl group, 3,4-epoxycyclohexylethyl group, or the like. $R^2$ in the organosilane (a') is an alkyl group with 1 to 5 carbon atoms or an acyl group with 1 to 4 carbon atoms such as, for example, methyl group, ethyl group, n-propyl group, i-propyl group, n-butyl group, sec-butyl group, tert-butyl group, acetyl group, or the like.

Specific examples of the organosilane (a') include methyltrimethoxysilane, methyltriethoxysilane, ethyltrimethoxysilane, ethyltriethoxysilane, n-propyltrimethoxysilane, n-propyltriethoxysilane, i-propyltrimethoxysilane, i-propyltriethoxysilane, gamma-chloropropyltrimethoxysilane, gamma-chloropropyltriethoxysilane, vinyltrimethoxysilane, vinyltriethoxysilane, 3,3,-triphloropropyltrimethoxysilane, 3,3,3-trifluoropropyltriethoxysilane, gamma-glycidoxypropyltrimethoxysilane, gamma-glycidoxypropyltriethoxysilane, gamma-methacryloxypropyltrimethoxysilane, gamma-methacryloxypropyltriethoxysilane, gamma-mercaptopropyltrimethoxysilane, gamma-mercaptopropyltriethoxysilane, phenyltrimethoxysilane, phenyltriethoxysilane, 3,4-epoxycyclohexylethyltrimethoxysilane, 3,4-epoxycyclohexylethyltriethoxysilane, or the like.

The preferable organosilanes (a') are methyltrimethoxysilane and methyltriethoxysilane.

Either one type of the organosilane (a') can be used independently or two or more types may be used in combination. It is preferable that 80 mol% or more of the organosilane (a') be $CH_3Si(OR^2)_3$.

Component (b)

The component (b) is a hydrolyzate and/or a partial condensate obtained by hydrolyzing and condensing diorganosilane (b') represented by formula $R^1_2Si(OR^2)_2$, wherein $R^1$ and $R^2$ are the same as for component (a) above, and is employed as a binder and also to make the coating film flexible and to improve the resistance to alkalis of the composition obtained in the present invention. The same discussions given above for $R^1$ and $R^2$ in the organosilane (a') apply to $R^1$ and $R^2$ in the diorganosilane (b').

Specific examples of diorganosilane (b') include dimethyldimethoxysilane, dimethyldiethoxysilane, diethyldimethoxysilane, diethyldiethoxysilane, di-n-propyldimethoxysilane, di-n-propyldiethoxysilane, di-i-propyldimethoxysilane, di-i-propyldiethoxysilane, diphenyldimethoxysilane, diphenyldiethoxysilane, and the like. The preferable diorganosilanes (b') are dimethyldimethoxysilane and dimethyldiethoxysilane. Either one type of diorganosilane (b') can be used independently or two or more types can be used together.

The component (b) is used in the composition of the present invention in the amount of 0 to 150 parts by weight, preferably 5 to 100 parts by weight, and most preferably 10 to 60 parts by weight, to 100 parts by weight of component (a'). If the amount exceeds 150 parts by weight, the adhesion and the curing characteristics of the resulting coating film are reduced.

Component (c)

The component (c), which is a vinyl resin containing a silyl group, is formed from a vinyl polymer as a main chain, and contains at least one, and preferably two or more, silyl group containing a silicon atom linked to a hydrolyzable group and/or a hydroxyl group at the end or in a side chain in one polymer molecule. Most of said silyl groups are shown by formula:

$$\begin{array}{c}(R^6)_{3-n}\\|\\-Si-X_n\end{array}$$

wherein X is a hydrolyzable group, such as halogen atom, alkoxy group, acyloxy group, aminoxy group, phenoxy group, thioalkoxy group, or amino group, or a hydroxyl group; $R^6$ is a hydrogen atom, an alkyl group with 1 to 10 carbon atoms or an aralkyl group with 1 to 10 carbon atoms; and n is an integer from 1 to 3.

There are no restrictions with respect to the method for producing the vinyl resin containing a silyl group (c). This component may be prepared, for example, by (i) reacting a hydrosilane compound and a vinyl resin which has a carbon-carbon double bond, or by (ii) polymerizing a silane compound represented by formula:

$$\begin{array}{c}(R^6)_{3-n}\\|\\R^7-Si-X_n\end{array}$$

wherein X, $R^6$, and n are the same as above; and $R^7$ is an organic group with a polymerizable double bond, with a vinyl compound.

Examples of hydrosilane compounds used in the above-mentioned manufacturing method (i) include hydrosilanes such as methyldichlorosilane, trichlorosilane, phenyldichlorosilane, and the like; alkoxysilanes such as methyldiethoxysilane, methyldimethoxysilane, phenyldimethoxysilane, trimethoxysilane, triethoxysilane, and the like; acyloxysilanes such as methyldiacetoxysilane, phenyldiacetoxysilane, triacetoxysilane, and the like; and aminosilanes such as methyldiaminoxysilane, triaminoxysilane, dimethylaminoxysilane, triaminosilane, and the like.

There are no particular restrictions as to the vinyl resin used in the above-mentioned manufacturing method (i) with the exception of vinyl resins containing a hydroxyl group. Preferred vinyl resins are copolymers of vinyl compounds, for example, (meth)acrylates such as methyl(meth)acrylate, ethyl(meth)acrylate, butyl(meth)acrylate, 2-ethylhexyl(meth)acrylate, cyclohexyl(meth)acrylate, and the like; carboxylic acids such as (meth)acrylic acid, itaconic acid, fumaric acid, and the like; acid anhydrides such as maleic anhydride, and the like; epoxy compounds such as glycidyl(meth)acrylate; amino compounds such as diethylaminoethyl(meth)acrylate, aminoethyl vinyl ether, and the like; amide compounds such as (meth)acrylamide, itaconic acid diamide, α-ethylacrylamide, crotonamide, fumaric acid diamide, maleic acid diamide, N-butoxymethyl(meth)acrylamide, and the like; acrylonitrile, styrene, α-methylstyrene, vinyl chloride, vinyl acetate, vinyl propionate, and the like.

The following compounds are given as examples of silane compounds used in the manufacturing method (ii).

$$\begin{array}{c}CH_3\\|\\CH_2=CHSi(OCH_3)_2\end{array}$$

$$CH_2=CHSi(OCH_3)_3$$

$$\begin{array}{c}CH_3\\|\\CH_2=CHSiCl_2\end{array}$$

$$CH_2=CHSiCl_3$$

$$\begin{array}{c}CH_3\\|\\CH_2=CHCOO(CH_2)_3Si(OCH_3)_2\end{array}$$

$$CH_2=CHCOO(CH_2)_3Si(OCH_3)_3$$

$$\begin{array}{c}CH_3\\|\\CH_2=CHCOO(CH_2)_3SiCl_2\end{array}$$

$$CH_2=CHCOO(CH_2)_3SiCl_3$$

$$\begin{array}{c}CH_3\\|\\CH_2=C(CH_3)COO(CH_2)_3Si(OCH_3)_2\end{array}$$

$$CH_2=C(CH_3)COO(CH_2)_3Si(OCH_3)_2$$

-continued $$CH_2=C(CH_3)COO(CH_2)_3SiCl_2 \overset{CH_3}{|}$$

$$CH_2=C(CH_3)COO(CH_2)_3SiCl_3$$

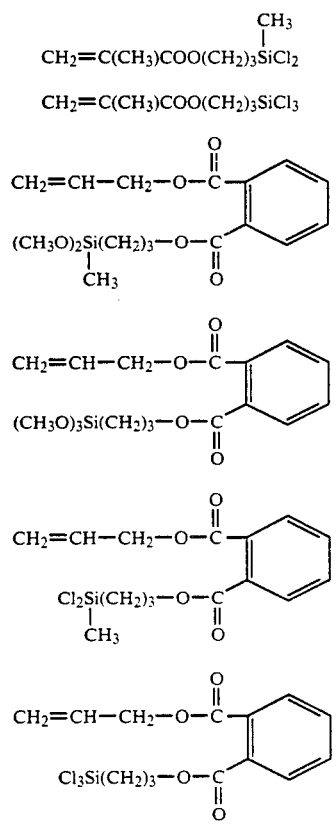

Vinyl compounds used in the polymerization of the vinyl resin in the manufacturing method (ii) can be used as the vinyl compounds in the manufacturing method (i). However, in addition to the examples given for the manufacturing method (i), vinyl compounds containing a hydroxyl group, such as 2-hydroxyethyl(meth)acrylate, 2-hydroxypropyl-(meth)acrylate, 2-hydroxyvinyl ether, N-methylolacrylamide, and the like can also be used.

Specific examples of the above-mentioned vinyl resin containing a silyl group (c) include acryl polymers containing a trialkoxysilyl group represented by formula,

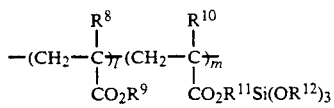

wherein $R^8$ is a hydrogen atom or a methyl group; $R^9$ is an alkyl group with 1 to 6 carbon atoms such as methyl group, ethyl group, n-propyl group, n-butyl group, i-butyl group, n-pentyl group, n-hexyl group, or the like; $R^{10}$ is the same as $R^8$; $R^{11}$ is an alkylene group with 1 to 4 carbon atoms such as methylene group, ethylene group, propylene group, butylene group, or the like; $R^{12}$ is the same as $R^9$; and $m/(l+m)=0.01$ to 0.4, and preferably 0.02 to 0.2.

The number average molecular weight of the vinyl resin containing a silyl group (c), in terms of polystyrene, is in the range of 2,000 to 100,000, and preferably 4,000 to 50,000.

Specific examples of the above-mentioned vinyl resin containing a silyl group (c) used in the present invention which are available on the market include Kaneka Zemurack (trade mark, manufactured by Kanegafuchi Chemical Industry Co., Ltd.), Coponyl (trade mark, manufactured by Nippon Synthetic Chemical Industry Co., Ltd.), and the like.

The vinyl resin containing a silyl group (c) is used in the composition of the present invention in the amount of 2 to 300 parts by weight, preferably 5 to 200 parts by weight, and most preferably 10 to 100 parts by weight, to 100 parts by weight of the organosilane (a') which is the raw material for component (a). If the amount is less than 2 parts by weight, the alkali resistance of the resulting coating film is reduced; if greater than 300 parts by weight, the weather resistance is poor.

Metal chelate compound (d)

Metal chelate compound (d) of the present invention is at least one metal chelate compound selected from a group of compounds represented by formulas $Zr(OR^3)_p(R^4COCHCOR^5)_{4-p}$, $Ti(OR^3)_q(R^4COCHCOR^5)_{4-q}$, and $Al(OR^3)_r(R^4COCHCOR^5)_{3-r}$. This component is considered to promote the condensation reaction among the above-mentioned components (a) and (b) and the vinyl resin containing a silyl group (c), so that components (a) and (b) form a copolymer with component (c).

In the metal chelate compound (d), $R^3$ and $R^4$ are the same or different alkyl groups with 1 to 6 carbon atoms. Specific examples include ethyl group, n-propyl group, i-propyl group, n-butyl group, sec-butyl group, t-butyl group, n-pentyl group, phenyl group, and the like. $R^5$ is an alkyl group with 1 to 6 carbon atoms or an alkoxy group with 1 to 16 carbon atoms, such as, for example, methoxy group, ethoxy group, n-propoxy group, i-propoxy group, n-butoxy group, sec-butoxy group, t-butoxy group, lauryl group, stearyl group, and the like. p and q are integers from 0 to 3; and r is an integer from 0 to 2.

Specific examples of the metal chelate compound (d) include zirconium chelate compounds such as tri-n-butoxyethylacetoacetate zirconium, di-n-butoxy.bis-(ethylacetoacetate) zirconium, n-butoxytris(ethylacetoacetate) zirconium, tetrakis(n-propylacetoacetate) zirconium, tetrakis(acetylacetoacetate) zirconium, tetrakis(ethylacetoacetate) zirconium, and the like; titanium chelate compounds such as diisopropoxy.bis-(ethylacetoacetate) titanium, diisopropoxy.bis(acetylacetonate) titanium, and the like; and aluminum chelate compounds such as diisopropoxyethylacetoacetate aluminum, diisopropoxyacetylacetonate aluminum, isopropoxy.bis(ethylacetoacetate) aluminum, isopropoxy.bis(acetylacetonate) aluminum, tris(ethylacetoacetate) aluminum, tris(acetylacetonate) aluminum, monoacetylacetonate.bis(ethylacetoacetate) aluminum, and the like. Among the above metal chelate compounds (d), tri-n-butoxyethylacetoacetate zirconium, diisopropoxy.bis(acetylacetonate) titanium, diisopropoxyethylacetoacetate aluminum, and tris(ethylacetoacetate) aluminum, are preferable. One type of the above metal chelate compounds (d) can be used independently or two or more types can be used in combination. In addition, partially hydrolyzed compounds of these metal chelate compounds can also be used as component (d).

The metal chelate compound (d) is used in the composition of the present invention in the amount of 0.01 to 50 parts by weight, preferably 0.1 to 50 parts by weight, and most preferably 0.5 to 10 parts by weight, to 100 parts by weight of organosilane (a') which is the raw material for component (a). If the amount is less than 0.01 parts by weight, the formation of a copolymer of components (a) and (b) with component (c) is inadequate and the weather resistance of the coating film is impaired; if greater than 50 parts by weight, the storage stability of the composition deteriorates and undesirable cracks may be produced in the resulting coating film.

Organic solvent (e)

Organic solvent (e) of the present invention is mainly used to homogeneously blend components (a) to (d), and to adjust the solid portion of the composition so that various coating methods can be applicable to the composition. At the same time, it improves the dispersion stability and the storage stability of the composition.

There are no particular restrictions as to the organic solvent used as component (e), so long as it can homogeneously mix components (a) to (d). Suitable solvents are, for example, alcohols, aromatic hydrocarbons, ethers, ketones, esters, and the like.

Examples of alcohols used as the solvent include monohydric and dihydric alcohols. Of the monohydric alcohols, saturated aliphatic alcohols with 1 to 8 carbon atoms are preferable. Specific examples of these alcohols include methanol, ethanol, n-propyl alcohol, i-propyl alcohol, n-butyl alcohol, sec-butyl alcohol, tert-butyl alcohol, ethylene glycol, diethylene glycol, triethylene glycol, ethylene glycol monobutyl ether, acetic acid ethylene glycol monoethyl ether, and the like.

Specific examples of aromatic hydrocarbons used as the solvent include benzene, toluene, xylene, and the like. Specific examples of ethers include tetrahydrofuran, dioxane, and the like. Specific examples of ketones include acetone, methyl ethyl ketone, methyl isobutyl ketone, diisobutyl ketone, and the like. Specific examples of esters include ethyl acetate, propyl acetate, butyl acetate, propylene carbonate, and the like.

One type of organic solvent (e) can be used independently or two or more types can be used together.

There are no particular restrictions as to the amount of organic solvent (e) used in the composition. Usually, an amount is determined so as to adjust the concentration of the total solid portion depending on the application to which the composition is directed.

Component (f)

Component (f) is a type of β-diketone and/or β-ketoester represented by formula $R^4COCH_2COR^5$ and is used as an agent for improving the stability of the composition of the present invention. Specifically, component (f) is presumed to coordinate with the metal atoms in the metal chelate compounds (d) (zirconium, titanium and/or aluminum compounds) present in the composition, which mainly comprises the above-mentioned (a) to (e) components, and to act so as to suppress the action of the metal chelate compounds for promoting the condensation reaction of the components (a) and (b) with the component (c), thus improving the storage stability of the resulting composition. $R^4$ and $R^5$ in component (f) are the same as $R^4$ and $R^5$ in metal chelate compound (d).

Specific examples of β-diketone and/or β-ketoester (f) include acetylacetone, methyl acetoacetate, ethyl acetoacetate, n-propyl acetoacetate, i-propyl acetoacetate, n-butyl acetoacetate, sec-butyl acetoacetate, t-butyl acetoacetate, 2,4-hexanedione, 2,4-heptanedione, 3,5-heptanedione, 2,4-octanedione, 2,4-nonanedione, 5-methylhexanedione, and the like. Among these, ethyl acetoacetate and acetylacetone are preferable, and acetylacetone is particularly preferable. One type of β-diketone and/or β-ketoester (f) can be used independently or two or more types can be used together.

This type of β-diketone and/or β-ketoester (f) is used in an amount of two or more mols, and preferably 3 to 20 mols, for one mol of metal chelate compound (d). If less than two mols, the storage stability of the resulting composition may be poor.

Components (a) to (f) are the main components of the composition of the present invention. As discussed hereinafter, in the preparation of such a composition, usually, a composition comprising components (a) to (e) (composition (I)) is first produced, and to this composition (I) a required amount of component (f) is added to obtain the composition of the present invention. Generally, when preparing said composition (I) comprising components (a) to (e), water (g) is added for the hydrolysis and condensation of organosilane (a'), which is a component forming component (a), and/or diorganosilane (b'), which a component forming component (b).

The amount of water (g) used is normally 1.2 to 3.0 mols, and preferably 1.3 to 2.0 mols, for one mol of organosilane (a'), and normally 0.8 to 2.0 mols, and preferably about 0.9 to 1.5 mols, for one mol of diorganosilane (b').

The total solid concentration of the composition of the present invention comprising components (a) to (f) is preferably 50% by weight or less and can be suitably adjusted depending on the intended use of the composition. When the object is to impregnate a thin-film substrate with the composition, the total solid concentration is normally 5 to 30% by weight. When used with the object of forming a thick film or dispersing a later-described filler (h), the total solid concentration is normally 20 to 50% by weight, and preferably 25 to 40% by weight. If greater than 50% by weight, the storage stability of the composition is undesirably worsened.

In addition, a colloidal silica can be added to the composition of this invention to improve the hardness of the coating film. Examples of types of colloidal silica which can be used for this purpose include an aqueous dispersion of colloidal silica, colloidal silica dispersed in an organic solvent such as methanol, isopropyl alcohol, or the like.

It is also possible to add and disperse filler (h) in the composition of the present invention to provide highly specialized characteristics in the resulting coating film; e.g., coloration of the coating film, formation of a thick film, prevention of UV ray transmission to the undercoat, provision of anticorrosion properties, heat resistance, and the like.

Examples of filler (h) include water-insoluble pigments such as organic pigments, inorganic pigments, and the like; and other than pigments, metals and alloys; oxides, hydroxides, carbides, nitrides, sulfides, and the like of the metals and alloys, all in the shape of particles, fibers, or scales. Specific examples of filler (h) in the shape of particles, fibers, or scales include iron, copper, aluminum, nickel, silver, zinc, ferrite, carbon black, stainless steel, silicon dioxide, titanium oxide, aluminum oxide, chromium oxide, manganese oxide, iron oxide, zircon, cobalt oxide, synthetic mullite, aluminum hydroxide, iron hydroxide, silicon carbide, silicon nitride, boron nitride, clay, kieselguhr, lime, gypsum, talc, barium carbonate, calcium carbonate, magnesium carbonate, barium sulfide, bentonite, mica, zinc green, chrome green, cobalt green, viridian, Guignet's green, cobalt-chrome green, Scheele green, green mud, manganese green, pigment green, ultramarine, Prussian blue, pigment blue, mountain blue, cobalt blue, cerulean blue, copper borate, molybdenum blue, copper sulfate, cobalt violet, mars violet, manganese violet, pigment violet, lead suboxide, calcium plumbate, zinc yellow, lead sulfate, chrome yellow, yellow ocher, cadmium yellow, strontium yellow, titanium yellow, litherge, pigment yellow, cuprous oxide, cadmium red, selenium red, chrome vermilion, Indian red, zinc white, antimony white, basic lead sulfate, titanium white, lithopone, lead silicate, zirconium oxide, tungsten white, zinc white, lead phthalate, manganese white, lead sulfate, graphite, bone black, diamond black, plant black, potassium titanate whisker, molybdenum disulfide, and the like.

The average particle diameter or average length of filler (h) is normally 50 to 50,000 nm, and preferably 100 to 5,000 nm. Filler (h) is used in the composition of the present invention in the amount of about 10 to 300 parts by weight to 100 parts by weight of the total solid portion of components (a) to (f). A curing promoter may also be used according to the curing conditions to provide faster curing of the composition of the present invention. The use of a curing agent is particularly effective when the composition is cured at a comparatively low temperature.

Examples of such a curing promoter include alkali metal salts of naphthenic acid, octylic acid, nitrous acid, sulfurous acid, aluminic acid, or the like; alkali compounds such as sodium hydroxide, potassium hydroxide, and the like; acidic compounds such as alkyl titanic acid, phosphoric acid, p-toluenesulfonic acid, phthalic acid, and the like; amine compounds such as ethylenediamine, hexanediamine, diethylenetriamine, triethylenetetramine, tetraethylenepentamine, piperidine, piperazine, m-phenylenediamine, ethanolamine, triethylamine, denatured amines used as an epoxy resin curing agent, gamma-aminopropyltriethoxysilane, gamma-(2-aminoethyl)aminopropyltrimethoxysilane, gamma-(2-aminoethyl)aminopropylmethyldimethoxysilane, gamma-anilinopropyltrimethoxysilane, and the like; carboxyic acid type organic tin compounds such as $(C_4H_9)_2Sn(OCOC_{11}H_{23})_2$, $(C_4H_9)_2Sn(OCOCH=CHCOOCH_3)_2$, $(C_4H_9)_2Sn(OCOCH=CHCOOC_4H_9)_2$, $(C_8H_{17})_2Sn(OCOC_{11}H_{23})_2$, $(C_8H_{17})_2Sn(OCOCH=CHCOOCH_3)_2$, $(C_8H_{17})_2Sn(OCOCH=CHCOOC_4H_9)_2$, $(C_8H_{17})_2Sn(OCOCH=CHCOOC_8H_{17})_2$, and the like; mercaptide-type organic tin compounds such as $(C_4H_9)_2Sn(SCH_2COOC_8H_{17})_2$, $(C_4H_9)_2Sn(SCH_2COOC_8H_{17})_2$, $(C_8H_{17})_2Sn(SCH_2COOC_8H_{17})_2$, $(C_8H_{17})_2Sn(SCH_2CH_2COOC_8H_{17})_2$, $(C_8H_{17})_2Sn(SCH_2COOC_8H_{17})_2$, $(C_8H_{17})_2Sn(SCH_2COOC_{12}H_{25})_2$, and

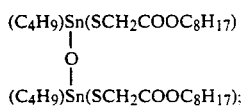

sulfide-type organic tin compounds such as,

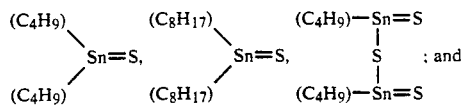

organic tin oxide such as $(C_4H_9)_2SnO$ and $(C_8H_{17})_2SnO$, as well as organic tin compounds formed by the reaction between an organic tin oxide such as $(C_4H_9)_2SnO$, $(C_8H_{17})_2SnO$, or the like and an ester compound such as ethyl silicate, ethyl silicate 40, dimethyl maleate, diethyl maleate, dioctyl phthalate, or the like.

The curing promoter is normally used in the composition of the present invention in the amount of 0.1 to 15 parts by weight, and preferably 0.5 to 10 parts by weight, for 100 parts by weight of the solid portion of the composition of the present invention.

Other additives which can be used in the composition of the present invention include commonly known dehydration agents such as methyl orthoformate, methyl orthoacetate, tetraethoxysilane, and the like; various types of surfactants, silane coupling agents other than those mentioned above, titanium coupling agents, dyes, dispersants, thickeners, leveling agents, and the like.

Furthermore, organic solvents other than the organic solvent (e) can be incorporated in the composition of the present invention. Such organic solvents may be any solvents which do not induce precipitation when components (a) to (d) are mixed together, and include aliphatic hydrocarbons, aromatic hydrocarbons, halogenated hydrocarbons, ketones, esters, ethers, ketone ethers, ketone esters, ester ethers, and the like, as used in normal paints and coating agents. Specific examples are benzene, toluene, xylene, methyl acetate, ethyl acetate, propyl acetate, butyl acetate, isoamyl acetate, and the like. These organic solvents are normally used in an amount of about 100 parts by weight or less to 100 parts by weight of the composition of the present invention.

Any method can be employed for preparing the composition of the present invention, so long as composition (I) containing components (a) to (e) is first prepared, and then component (f) is added to composition (I). The following methods (1) to (3) are examples of such methods which can preferable be employed.

(1) A method comprising preparing a solution containing an organosilane (a') as component (a), a diorganosilane (b') as component (b), a vinyl resin containing a silyl group as component (c), a metal chelate compound as component (d), and an organic solvent as component (e); adding 1.2 to 3 mols of water for one mol of the organosilane (a') and 0.8 to 2 mols of water for one mol of the diorganosilane (b'), to effect a hydrolysis/condensation reaction, thus producing composition (I); and adding β-diketone and/or β-ketoester which is component (f).

(2) A method comprising preparing a solution containing an organosilane (a') as component (a), a diorganosilane (b') as component (b), and an organic solvent component (e); adding 1.2 to 3 mols of water for one mol of the organosilane (a') and 0.8 to 2 mols of water for one mol of the diorganosilane (b'), to effect a hydrolysis/condensation reaction; adding a vinyl resin containing a silyl group, as component (c), and a metal chelate compound, as component (d), thus producing composition (I); and adding to the resulting mixture β-diketone and/or β-ketoester which is component (f).

(3) A method comprising preparing a solution containing an organosilane (a') as component (a), a diorganosilane (b') as component (b), a metal chelate compound as component (d), and an organic solvent as component (e); adding 1.2 to 3 mols of water for one mol of the organosilane (a') and 0.8 to 2 mols of water for one mol of the diorganosilane (b'), to effect a hydrolysis/condensation reaction; adding a vinyl resin containing a silyl group as component (c), thus producing composition (I); and adding to the resulting mixture β-diketone and/or β-ketoester which is component (f).

A coating film can be formed by applying the composition of the present invention in a first application of a thickness of about 1 to 40 μm, followed by two or three additional applications of a thickness of about 2 to 80 μm, to the surface of the object substrate by brushing, spraying, or dipping, then drying at room temperature or heating for about 10 to 60 minutes at a temperature of about 30° to 200° C.

The substrate on which the composition is coated can be, for example, stainless steel, aluminum, ceramic, cement, paper, glass, plastic, inorganic ceramic substrates, cloth, and the like.

When coating the composition of the present invention, it is possible to provide a primer of conventionally known acrylic resin, epoxy resin, urethane resin, polyester resin, or the like on the above substrate in advance in order to provide the substrate with better adhesion or smoothness, to give ornamental designs on the surface, or to offset the texture of porous materials.

Other features of the invention will become apparent in the course of the following description of the exemplary embodiments which are given for illustration of the invention and are not intended to be limiting thereof.

EXAMPLES

Throughout the following examples, parts and percentages are by weight unless specifically stated otherwise. The various measurements were performed as outlined below.

Average molecular weight

The average molecular weight in terms of polystyrene was measured by gel permeation chromatography (GPC) under the following conditions. The test material was prepared by dissolving one gram of organopolysiloxane in 100 cc of tetrahydrofuran solvent.

The standard polystyrene manufactured by Pressure Chemical Co. of the U.S. was used.

Equipment High temperature, high speed gel permeation chromatogram (Model 150-C ALC/GPC: trade mark, manufactured by Waters Co., U.S.)
Column : 50 cm column, SHODEX A-8M (trade mark, manufactured by Showa Denko K. K.)
Measurement temperature: 40° C.
Flow rate: 1 cc per minute

Storage stability

The storage stability was visually judged from the presence or absence of gel formation when the sample was stored in a tightly sealed polyethylene bottle without the addition of a curing promoter. The viscosity of material in which no gelling occurred was measured in a BM model viscosimeter (manufactured by Tokyo Keiki Co., Ltd.). A material exhibiting a viscosity change of 20% or less was deemed to be unchanged.

Adhesion

The adhesion was measured by subjecting the sample three times to a cross-cut adhesion test in accordance with JIS K5400 followed by a tape peeling test. The average was taken as the adhesion of the test sample.

Hardness

Hardness was based on pencil hardness in accordance with JIS K5400.

Resistance to alkali (1)

Resistance to alkali (1) was measured by adding one cc of 40% aqueous solutions of sodium hydroxide dropwise onto the coating film, allowing it to stand for 6 hours in a lidded laboratory dish, washing with water, then observing the condition of the coating film. The maximum concentration of an aqueous solution of sodium hydroxide which caused no abnormalities to the film was thus determined.

Resistance to alkali (2)

Resistance to alkali (2) was measured by immersing a substrate coated with the composition in a saturated aqueous solution of calcium hydroxide for 60 days, then observing the condition of the coating film.

Resistance to weathering

Resistance to weathering was measured by conducting a 3,000 hour irradiation test in a weather meter in accordance with JIS K5400, then observing the condition of the coating film.

Resistance to organic chemicals

Resistance to organic chemicals was measured by adding 2 cc of isopropyl alcohol dropwise onto the coating film, wiping with a cloth after 5 minutes, then observing the condition of the coating film.

Resistance to humidity

Resistance to humidity was measured by continuous storage for 1,000 hours at a temperature of 50° C. under 95% relative humidity, then removing the sample and observing the condition of the coating film.

Resistance to water

Resistance to water was measured by immersion the sample in tap water for 60 days at room temperature, then observing the condition of the coating film.

Resistance to hot water

Resistance to hot water was measured by immersing the an inorganic substrate onto which the composition was coated in hot water at 60° C. for 14 days, then observing the condition of the coating film.

Recovery from staining

Recovery from staining was measured by coating a paste made from a 1:2 mixture of carbon black and kerosene onto the coating film, holding it at room temperature for 24 hours, washing with water using a sponge, then observing the condition of recovery from staining of the coating film. A sample with no staining was indicated by AAA, with slight staining by BBB, and with severe staining by CCC.

Reference Example 1

Preparation of Vinyl Resin Containing a Silyl Group 90 parts of methylmethacrylate, 40 parts of n-butylacrylate, 20 parts of gamma-methacryloxypropyltrimethoxysilane, and 130 parts of xylene were charged to a reaction vessel equipped with a condenser and a stirrer. After blending, the mixture was heated with stirring to 80° C. and a solution containing 4 parts of azobisisovaleronitrile in 10 parts of xylene was added dropwise to this mixture over a period of 30 minutes. The mixture was reacted for 5 hours at 80° C. to obtain a solution of a vinyl resin containing a silyl group (i) with a solids concentration of 50%. By gel permeation chromatography of this vinyl resin containing a silyl group, the number average molecular weight (polystyrene equivalent) was determined to be 12,000. It was estimated that the resin contained an average of 6 silyl groups for one molecule of polymer.

Reference Example 2

Preparation of Organopolysiloxane 100 parts of methyltrimethoxysilane (a'), 30 parts of dimethyldimethoxysilane (b'), 25 parts of ion exchanged water, and 0.01 part of a 0.1N aqueous solution of hydrochloric acid were added to a reaction vessel equipped with a condenser and a stirrer, and blended. The mixture was heated with stirring to 60° C. and reacted at this temperature for 3 hours to obtain a solution of organopolysiloxane (ii) with a solid concentration of 44%.

By gel permeation chromatography of this organopolysiloxane, the number average molecular weight was determined to be 1,500.

Examples 1–5, Comparative Examples 1–9

100 parts of methyltrimethoxysilane (a'), 50 parts of dimethyldimethoxysilane (b'), Kaneka Zemrack (solid content, 50%: manufactured by Kanegafuchi Chemical Industry Co., Ltd.), 20 parts (0.07 mol equivalent) of diisopropoxyethylacetoacetate aluminum (d), and 40 parts of i-propanol (e) were added to a reaction vessel equipped with a condenser and a stirrer. After mixing, 30 parts of ion exchanged water was added, and the mixture was reacted for 4 hours at 60° C., after which it was cooled to room temperature. 20 parts (0.2 mol equivalent) of acetylacetone (f) was added to obtain a coating composition A. Using the same type of reaction vessel, compositions B to O given in Table 1 were also obtained. Composition O was obtained by adding the components (a') to (f) simultaneously.

Example 6

155 parts of the organopolysiloxane (ii) obtained in Reference Example 2, 45 parts of the vinyl resin containing a silyl group (i) obtained in Reference Example 1, 8 parts (0.029 mol equivalent) of diisopropoxyethylacetoacetate aluminum (d), and 34 parts of i-propyl alcohol (e) were added to a reaction vessel equipped with a condenser and a stirrer, and blended. The mixture was reacted for 2 hours at 50° C. with stirring, after which 20 parts (0.2 mol equivalent) of acetylacetone (f) was added, and the mixture was cooled to room temperature to obtain a composition L of 35% solids concentration.

The storage stability of these compositions A to L, and the evaluation results for a test leaf obtained by coating the composition onto an alkali-defatted aluminum plate (JIS H4000, A1050P) to a dried thickness of 20 μm, then heating for 10 minutes at 150° C., are given in Table 1.

Examples 7–12, Comparative Examples 10–15

Fillers and additives were added to compositions A to M in the quantities shown in Table 2, and the mixtures were kneaded using a sand mill to obtain compositions (a) to (k). Coatings formed by blending compositions (a) to (k) with 2% dibutyltindilaurate as a curing agent were applied to substrates formed by coating Mighty Eposealer (an epoxy resin sealer manufactured by Dai Nippon Toryo Co., Ltd.) onto a slate plate (JIS A5043F) to give a dried weight of 50 gm/m$^2$. The paints to which dibutyltindilaurate was added as mentioned above were applied to the prepared substrates to give a dried weight of 50 gm/m$^2$, and heated at 120° C. for 10 minutes to prepare test leaves. Various tests were performed using these tests leaves, to give the results shown in Table 2.

TABLE 1-1

| Composition | | Example 1 A | Example 2 B | Example 3 C | Example 4 D | Example 5 E | Example 6 L |
|---|---|---|---|---|---|---|---|
| Component (parts) | | | | | | | |
| (a') | Methyltrimethoxysilane | 100 | 90 | 100 | 100 | 100 | 100 |
| (a') | gamma-Glycidoxypropyl-trimethoxysilane | — | 10 | — | — | — | 30 |
| (b') | dimethyldimethoxysilane | 50 | 30 | 10 | 60 | — | — |
| (c) | Kaneka Zemrack | 50 | 60 | — | — | — | — |
| (c) | Solution of silyl group-containing vinyl resin (i) | — | — | 50 | 100 | 20 | 45 |
| (d) | Diisopropoxyethylaceto-acetate aluminum | 20 | — | — | — | — | 8 |
| (d) | Tris(ethylacetoacetate) aluminum | — | — | 10 | — | 4 | — |
| (d) | Diisopropoxybis(acetyl-acetonate) titanium | — | 10 | — | — | — | — |
| (d) | Tri-n-butoxyethylaceto-acetate zirconium | — | — | — | 10 | — | — |
| | Mol equivalent of component (d) | 0.07 | 0.027 | 0.024 | 0.023 | 0.01 | 0.029 |
| (e) | Isopropyl alcohol | 40 | 31 | 30 | 49 | 26 | 34 |
| (e) | Ethylene glycol monobutyl ether | — | 20 | — | 40 | — | — |
| | Ion-exchanged water | 30 | 25 | 23 | 29 | 20 | 25 |
| (f) | Acetylacetone | | | | | | |
| Reaction conditions | | | | | | | |

TABLE 1-1-continued

|  | Composition | Example 1 A | Example 2 B | Example 3 C | Example 4 D | Example 5 E | Example 6 L |
|---|---|---|---|---|---|---|---|
|  | Temperature (°C.) | 60 | 60 | 60 | 60 | 60 | 60 |
|  | Time (Hour) | 4 | 3 | 5 | 4 | 2.5 | 2.5 |
|  | Components added later |  |  |  |  |  |  |
| (f) | Acetylacetone | 20 | — | 7 | 12 | 10 | 20 |
| (f) | Acetoacetylacetone | — | 16 | — | — | — | — |
|  | Mol equivalent of Component (f) | 0.2 | 0.12 | 0.07 | 0.12 | 0.1 | 0.2 |
|  | Solid portion (%) | 35 | 35 | 36 | 35 | 35 | 35 |
|  | Evaluation |  |  |  |  |  |  |
|  | Storage stability | No change in 3 months | No change in 3 months | No change in 3 months | No change in 3 months | No change in 3 months | No change in 3 months |
|  | Adhesion | 100/100 | 100/100 | 100/100 | 100/100 | 100/100 | 100/100 |
|  | Hardness | 3H | 3H | 4H | 2H | 5H | 3H |
|  | Alkali resistance (1) (%) | 10 | 10 | 10 | 10 | 5 | 10 |
|  | Weather resistance | No change | No change | No change | No change | No change | No change |
|  | Chemical resistance | No abnormality | No abnormality | No abnormality | No abnormality | No abnormality | No abnormality |

TABLE 1-2

| Composition | Comparative Example 1 F | Comparative Example 2 G | Comparative Example 3 H | Comparative Example 4 I | Comparative Example 5 J | Comparative Example 6 K | Comparative Example 7 M | Comparative Example 8 N | Comparative Example 9 O |
|---|---|---|---|---|---|---|---|---|---|
| Component (parts) | | | | | | | | | |
| (a') Methyltrimethoxysilane | 100 | 100 | 100 | 100 | 100 | 100 | 100 | 100 | 100 |
| (a') gamma-Glycidoxypropyl-trimethoxysilane | — | — | — | — | — | — | — | — | — |
| (b') dimethyldimethoxysilane | 50 | 170 | 10 | 50 | 60 | 60 | 50 | — | 50 |
| (c) Kaneka Zemrack | 50 | — | — | — | — | — | 50 | — | 50 |
| (c) Solution of silyl group-containing vinyl resin (i) | — | 50 | 350 | — | 100 | 100 | — | 20 | — |
| (d) Diisopropoxyethylaceto-acetate aluminum | 20 | — | 20 | 20 | — | — | 20 | — | 20 |
| (d) Tris(ethylacetoacetate) aluminum | — | — | — | — | — | — | — | — | — |
| (d) Diisopropoxybis(acetyl-acetonate)titanium | — | 10 | — | — | — | — | — | — | — |
| (d) Tri-n-butoxyethylaceto-acetate zirconium | — | — | — | — | — | 60 | — | — | — |
| Mol equivalent of component (d) | 0.07 | 0.024 | 0.07 | 0.07 | 0 | 0.14 | 0.07 | 0 | 0.07 |
| (e) Isopropyl alcohol | 60 | 68 | 170 | 20 | 59 | 11 | 53 | 30 | 40 |
| (e) Ethylene glycol monobutyl ether | — | 60 | — | — | 40 | — | — | — | — |
| Ion-exchanged water | 30 | 50 | 23 | 30 | 29 | 29 | 30 | 20 | 30 |
| (f) Acetylacetone | — | — | — | — | — | — | — | — | 20 |
| Reaction conditions | | | | | | | | | |
| Temperature (°C.) | 60 | 60 | 60 | 60 | 60 | 60 | 60 | 60 | 60 |
| Time (Hour) | 4 | 6 | 2 | 5 | 4 | 2 | 4 | 4 | 4 |
| Components added later | | | | | | | | | |
| (f) Acetylacetone | — | 7 | 40 | 20 | 12 | 40 | 7 | 10 | — |
| (f) Acetoacetylacetone | — | — | — | — | — | — | — | — | — |
| Mol equivalent of component (f) | 0 | 0.07 | 0.4 | 0.2 | 0.12 | 0.4 | 0.07 | 0.1 | — |
| Solid portion (%) | 35 | 35 | 33 | 33 | 35 | 35 | 35 | 35 | 35 |
| Evaluation | | | | | | | | | |
| Storage stability | Gelatinized in 20 days | No change in 3 months | Gelatinized in 20 days | No change in 3 months | No change in 3 months | Gelatinized in 10 days | Gelatinized in 2 month | No change in 3 months | No change in 3 months |
| Adhesion | 100/100 | 100/100 | 100/100 | 100/100 | 100/100 | 100/100 | 100/100 | 100/100 | 100/100 |
| Hardness | 3H | 4B | HB | 3H | H | 3H | 3H | 3H | 2H |
| Alkali resistance (1) (%) | 10 | 2 | 5 | 2 | 2 | 10 | 10 | 1 | 2 |
| Weather resistance | No change | Coated film released | Glossiness was lowered | No change | Glossiness was lowered | Cracks were produced | No change | Glossiness was lowered | Glossiness was lowered |
| Chemical resistance | No abnormality | Coated film dissolved | Glossiness was lowered | No abnormality | Glossiness was lowered | No abnormality | No abnormality | No abnormality | Glossiness was lowered |

TABLE 2-1

| Example | Example 7 | Example 8 | Example 9 | Example 10 | Example 11 | Example 12 |
|---|---|---|---|---|---|---|
| Components for Composition (Parts) | | | | | | |
| Composition used | A | B | C | D | E | L |
| Amount of composition | 100 | 100 | 100 | 100 | 100 | 100 |
| Titanium oxide (White) | 23 | 23 | 23 | 23 | 23 | 23 |
| Cellulose-type thickner | 0.5 | 0.5 | 0.5 | 0.5 | 0.5 | 0.5 |
| Designation of composition after formulating additives | (a) | (b) | (c) | (d) | (e) | (l) |
| Evaluation | | | | | | |
| Adhesion | 100/100 | 100/100 | 100/100 | 100/100 | 100/100 | 100/100 |
| Hardness | 3H | 3H | 4H | 2H | 4H | 3H |
| Alkali resistance (2) (%) | No abnormality | No abnormality | No abnormality | No abnormality | No abnormality | No abnormality |
| Chemical resistance | No abnormality | No abnormality | No abnormality | No abnormality | No abnormality | No abnormality |
| Moisture resistance | No abnormality | No abnormality | No abnormality | No abnormality | No abnormality | No abnormality |
| Weather resistance | No abnormality | No abnormality | No abnormality | No abnormality | No abnormality | No abnormality |
| Water resistance | No abnormality | No abnormality | No abnormality | No abnormality | No abnormality | No abnormality |
| Hot water resistance | No abnormality | No abnormality | No abnormality | No abnormality | No abnormality | No abnormality |
| Restoration from staining | AAA | AAA | AAA | AAA | AAA | AAA |
| Storage stability | No change in 3 months | No change in 3 months | No change in 3 months | No change in 3 months | No change in 3 months | No change in 3 months |

| Example | Comparative Example 10 | Comparative Example 11 | Comparative Example 12 | Comparative Example 13 | Comparative Example 14 | Comparative Example 15 |
|---|---|---|---|---|---|---|
| Components for Composition (Parts) | | | | | | |
| Composition used | F | G | H | I | J | K |
| Amount of composition | 100 | 100 | 100 | 100 | 100 | 100 |
| Titanium oxide (White) | 23 | 23 | 23 | 23 | 23 | 23 |
| Cellulose-type thickner | 0.5 | 0.5 | 0.5 | 0.5 | 0.5 | 0.5 |
| Designation of composition after formulating additives | (f) | (g) | (h) | (i) | (j) | (k) |
| Evaluation | | | | | | |
| Adhesion | 100/100 | 100/100 | 100/100 | 100/100 | 100/100 | 100/100 |
| Hardness | 3H | 3B | HB | 3H | H | 3H |
| Alkali resistance (2) (%) | No abnormality | No abnormality | No abnormality | Cracks were produced | Cracks were produced | Cracks were produced |
| Chemical resistance | No abnormality | Coated film dissolved | Glossiness was lowered | No abnormality | Glossiness was lowered | No abnormality |
| Moisture resistance | No abnormality | No abnormality | No abnormality | No abnormality | No abnormality | Cracks were produced |
| Weather resistance | No abnormality | Coated film released | Glossiness was lowered | Cracks were produced | Glossiness was lowered | Cracks were produced |
| Water resistance | No abnormality | No abnormality | No abnormality | Cracks were produced | Cracks were produced | Cracks were produced |
| Hot water resistance | No abnormality | No abnormality | No abnormality | Cracks were produced | Cracks were produced | Cracks were produced |
| Restoration from staining | AAA | CCC | BBB | AAA | BBB | AAA |
| Storage stability | Gelatinized in 10 days | No change in 3 months | Gelatinized in 15 days | No change in 3 months | No change in 3 months | Gelatinized in 5 days |

The coating composition of the present invention exhibits highly superior storage stability, is transparent, and has superior characteristics with respect resistance to heat, moisture, sea water, organic chemicals, acids, alkalis, corrosion, abrasion, weathering, humidity, and the like. It exhibits excellent adhesion and can form a coating film which has a high degree of hardness.

Obviously, numerous modifications and variations of the present invention are possible in light of the above teachings. It is therefore to be understood that within the scope of the appended claims, the invention may be practiced otherwise than as specifically described herein.

What is claimed is:

1. A coating composition comprising, (I) a composition which comprises the following components (a), (b), (c), (d), and (e):

(a) 100 parts by weight, in terms of organosilane, of a hydrolyzate and/or a partial condensate of an organosilane represented by formula $R^1Si(OR^2)_3$, wherein $R^1$ is an organic group with 1 to 8 carbon atoms, and $R^2$ is an alkyl group with 1 to 5 carbon atoms, or an acyl group with 1 to 4 carbon atoms, (b) 0 to 150 parts by weight, in terms of diorganosilane, of a hydrolyzate and/or a partial condensate of a diorganosilane represented by formula $R^1{}_2Si(OR^2)_2$, wherein $R^1$ and $R^2$ are the same as defined above, (c) 2 to 300 parts by weight of a vinyl resin containing a silyl group with at least one silyl group containing a silicon atom linked to a hydrolyzable group and/or a hydroxyl group at the end or at a side chain in one polymer molecule, (d) 0.01 to 50 parts by weight of at least one metal chelate compound selected from a group of compounds represented by formulas $Zr(OR^3)_p(R^4COCHCOR^5)_{4-p}$, $Ti(OR^3)_q(R^4COCHCOR^5)_{4-q}$, or Al(OR³)ₚ(R⁴COCHCOR⁵)₃₋ᵣ, wherein R³ and R⁴ are the same or different alkyl groups with 1 to 6 carbon atoms, R⁵ is an alkyl group with 1 to 5 carbon atoms or an alkoxy group with 1 to 16 carbon atoms, p and q are integers from 0 to 3, and r is an integer from 0 to 2, and (e) an organic solvent; and (f) at least 2 mols, for one mol of said metal chelate compound (d) in said composition (I), of a β-diketone compound and/or β-ketoester compound represented by formula R⁴COCH₂COR⁵, wherein R⁴ and R⁵ are the same as above.

2. The coating composition according to claim 1, wherein said component (a) is a partial condensate of said organosilane (a') and has a weight average molecular weight, in terms of polystyrene, of 500 to 50,000.

3. The coating composition according to claim 1, wherein said organosilane (a') is at least one member selected from the group consisting of methyltrimethoxysilane, methyltriethoxysilane, ethyltrimethoxysilane, ethyltriethoxysilane, n-propyltrimethoxysilane, n-propyltriethoxysilane, i-propyltrimethoxysilane, i-propyltriethoxysilane, gamma-chloropropyltrimethoxysilane, gamma-chloropropyltriethoxysilane, vinyltrimethoxysilane, vinyltriethoxysilane, 3,3,3-trifluoropropyltrimethoxysilane, 3,3,3-trifluoropropyltriethoxysilane, gamma-glycidoxypropyltrimethoxysilane, gamma-glycidoxypropyltriethoxysilane, gamma-methacryloxypropyltrimethoxysilane, gamma-methacryloxypropyltriethoxysilane, gamma-mercaptopropyltrimethoxysilane, gamma-mercaptopropyltriethoxysilane, phenyltrimethoxysilane, phenyltriethoxysilane, 3,4-epoxycyclohexylethyltrimethoxysilane, and 3,4-epoxycyclohexylethyltriethoxysilane.

4. The coating composition according to claim 1, wherein the amount of said component (b) is 5 to 100 parts by weight.

5. The coating composition according to claim 1, wherein said at least one silyl group contained in said vinyl resin of component (c) is selected from silyl groups represented by the following formula:

wherein X represents a halogen atom, alkoxy group, acyloxy group, aminoxy group, phenoxy group, thioalkoxy group, or amino group, hydroxyl group; R⁶ is a hydrogen atom, an alkyl group with 1 to 10 carbon atoms, or an aralkyl group with 1 to 10 carbon atoms; and n is an integer from 1 to 3.

6. The coating composition according to claim 1, wherein said component (c) is (i) a reaction product of a hydrosilane compound and a vinyl resin which has a carbon-carbon double bond, or (ii) a polymerization product of a silane compound represented by the following formula:

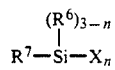

wherein X represents a halogen atom, alkoxy group, acyloxy group, aminoxy group, phenoxy group, thioalkoxy group, or amino group, hydroxyl group; R⁶ is a hydrogen atom, an alkyl group with 1 to 10 carbon atoms, or an aralkyl group with 1 to 10 carbon atoms; and R⁷ is an organic group containing a double bond polymerizable with a vinyl compound; and n is an integer from 1 to 3.

7. The coating composition according to claim 1, wherein the amount of said component (c) is 5 to 200 parts by weight.

8. The coating composition according to claim 1, wherein said component (c) has a number average molecular weight, in terms of polystyrene, of 2,000 to 100,000.

9. The coating composition according to claim 1, wherein said metal chelate compound of component (d) is one or more compounds selected from the group consisting of tri-n-butoxyethylacetoacetate zirconium, di-n-butoxy.bis-(ethylacetoacetate) zirconium, n-butoxytris(ethylaceto-acetate) zirconium, tetrakis(n-propylacetoacetate) zirconium, tetrakis(acetylacetoacetate) zirconium, tetrakis(ethylacetoacetate) zirconium, diisopropoxy.bis-(ethylacetoacetate) titanium, diisopropoxy.bis(acetylacetonate) titanium, diisopropoxyethylacetoacetate aluminum, diisopropoxyacetylacetonate aluminum, isopropoxy.bis(ethylacetoacetate) aluminum, isopropoxy.bis(acetylacetonate) aluminum, tris(ethylacetoacetate) aluminum, tris(acetylacetonate) aluminum, and monoacetylacetonate.bis(ethylacetoacetate) aluminum.

10. The coating composition according to claim 1, wherein said component (e) is one or more solvents selected from the group consisting of alcohols, aromatic hydrocarbons, ethers, ketones, and esters.

11. The coating composition according to claim 1, wherein said β-diketone or β-ketoester of component (f) is one or more compounds selected from the group consisting of acetylacetone, methyl acetoacetate, ethyl acetoacetate, n-propyl acetoacetate, i-propyl acetoacetate, n-butyl acetoacetate, sec-butyl acetoacetate, t-butyl acetoacetate, 2,4-hexanedione, 2,4-heptanedione, 3,5-heptanedione, 2,4-octanedione, 2,4-nonanedione, and 5-methylhexanedione.

12. The coating composition according to claim 1, wherein the amount of said component (f) is 3 to 20 mols for component (d).

13. The coating composition according to claim 1, containing 10 to 300 parts by weight said component (f) for 100 parts by weight of the solid portion of said composition (I) which comprises said components (a), (b), (c), (d), and (e).

14. The coating composition according to claim 1, further comprising a hardening promoter.

15. A process for preparing a coating composition comprising, providing composition (I) which comprises the following components (a), (b), (c), (d), and (e):

(a) for 100 parts by weight, in terms of organosilane, of a hydrolyzate and/or a partial condensate of an organosilane represented by formula R¹Si(OR²)₃, wherein R¹ is an organic group with 1 to 8 carbon atoms, and R² is an alkyl group with 1 to 5 carbon atoms, or an acyl group with 1 to 4 carbon atoms, (b) 0 to 150 parts by weight, in terms of diorganosilane, of a hydrolyzate and/or a partial condensate of a diorganosilane represented by formula R¹₂Si(OR²)₂ wherein R¹ and R² are the same as defined above, (c) 2 to 300 parts by weight of a vinyl resin containing a silyl group with at least one silyl group containing a silicon atom linked to a hydrolyzable group and/or a hydroxyl group at the end or a side chain in one polymer molecule,
(d) 0.01 to 50 parts by weight of at least one metal chelate compound selected from a group of compounds represented by formulas $Zr(OR^3)_p(R^4COCHCOR^5)_{4-p}$, $Ti(OR^3)_q(R^4COCHCOR^5)_{4-q}$, or $Al(OR^3)_r(R^4COCHCOR^5)_{3-r}$, wherein $R^3$ and $R^4$ are the same or different alkyl groups with 1 to 6 carbon atoms, $R^5$ is an alkyl group with 1 to 5 carbon atoms or an alkoxy group with 1 to 16 carbon atoms, p and q are integers from 0 to 3, and r is an integer from 0 to 2, and
(e) an organic solvent; and
mixing said composition (I) with component (f), which is at least 2 mols, for one mol of said metal chelate compound (d) in said composition (I), of a β-diketone compound and/or β-ketoester compound represented by formula $R^4COCH_2COR^5$, wherein $R^4$ and $R^5$ are the same as above.

16. A process according to claim 15 comprising steps of,
preparing a solution comprising said organosilane as component (a), said diorganosilane as component (b), a vinyl resin containing a silyl group as component (c), a metal chelate compound as component (d), and an organic solvent as component (e);
adding 1.2 to 3 mols of water for one mol of the organosilane (a') and 0.8 to 2 mols of water for one mol of the diorganosilane (b'), to effect a hydrolysis/condensation reaction, thus producing composition (I); and
adding β-diketone and/or β-ketoester which is component (f).

17. A process according to claim 15 comprising steps of,
preparing a solution comprising said organosilane as component (a), said diorganosilane as component (b) and an organic solvent component (e);
adding 1.2 to 3 mols of water for one mol of the organosilane and 0.8 to 2 mols of water for one mol of the diorganosilane, to effect a hydrolysis/condensation reaction;
adding a vinyl resin containing a silyl group, as component (c), and a metal chelate compound, as component (d), thus producing composition (I); and
adding to the resulting mixture β-diketone and/or β-ketoester which is component (f).

18. A process according to claim 15 comprising steps of,
preparing a solution comprising said organosilane as component (a), said diorganosilane as component (b) and a metal chelate compound as component (d), and an organic solvent component (e);
adding 1.2 to 3 mols of water for one mol of the organosilane and 0.8 to 2 mols of water for one mol of the diorganosilane, to effect a hydrolysis/condensation reaction;
adding a vinyl resin containing a silyl group, as component (c), thus producing composition (I); and
adding to the resulting mixture β-diketone and/or β-ketoester which is component (f).

* * * * *